(12) United States Patent
Mikaki

(10) Patent No.: US 11,089,769 B2
(45) Date of Patent: Aug. 17, 2021

(54) GUIDE MEMBER FOR FISHING LINE

(71) Applicant: KYOCERA Corporation, Kyoto (JP)

(72) Inventor: Shunji Mikaki, Satsumasendai (JP)

(73) Assignee: KYOCERA Corporation, Kyoto (JP)

( * ) Notice: Subject to any disclaimer, the term of this patent is extended or adjusted under 35 U.S.C. 154(b) by 409 days.

(21) Appl. No.: 15/778,126

(22) PCT Filed: Nov. 25, 2016

(86) PCT No.: PCT/JP2016/084938
§ 371 (c)(1),
(2) Date: May 22, 2018

(87) PCT Pub. No.: WO2017/090717
PCT Pub. Date: Jun. 1, 2017

(65) Prior Publication Data
US 2018/0343841 A1 Dec. 6, 2018

(30) Foreign Application Priority Data

Nov. 28, 2015 (JP) .............. JP2015-232503

(51) Int. Cl.
*A01K 87/04* (2006.01)
*C04B 35/117* (2006.01)
*C04B 35/111* (2006.01)
*C04B 35/101* (2006.01)
*C04B 35/119* (2006.01)
*C04B 35/64* (2006.01)

(52) U.S. Cl.
CPC .......... *A01K 87/04* (2013.01); *C04B 35/1015* (2013.01); *C04B 35/111* (2013.01); *C04B 35/117* (2013.01); *C04B 35/119* (2013.01); *C04B 35/64* (2013.01); *C04B 2235/3217* (2013.01); *C04B 2235/3225* (2013.01); *C04B 2235/3232* (2013.01); *C04B 2235/3241* (2013.01); *C04B 2235/3244* (2013.01); *C04B 2235/3262* (2013.01); *C04B 2235/3272* (2013.01); *C04B 2235/3275* (2013.01); *C04B 2235/3418* (2013.01); *C04B 2235/6567* (2013.01); *C04B 2235/786* (2013.01); *C04B 2235/788* (2013.01); *C04B 2235/80* (2013.01); *C04B 2235/9607* (2013.01); *C04B 2235/9661* (2013.01)

(58) Field of Classification Search
CPC ... A01K 87/04; C04B 35/1015; C04B 35/111; C04B 2235/788; C04B 2235/9661
See application file for complete search history.

(56) References Cited

U.S. PATENT DOCUMENTS

| | | | | |
|---|---|---|---|---|
| 4,067,792 A * | 1/1978 | Semkina | ............... | C04B 35/111 |
| | | | | 204/400 |
| 9,365,692 B2 * | 6/2016 | Schofalvi | ........... | C08G 18/3206 |
| 2008/0118722 A1 * | 5/2008 | Shikata | ................... | C04B 35/64 |
| | | | | 428/212 |
| 2010/0243764 A1 * | 9/2010 | Okesaku | ................... | B28B 7/18 |
| | | | | 239/589 |
| 2012/0227445 A1 * | 9/2012 | Citti | ...................... | C03B 17/064 |
| | | | | 65/53 |
| 2013/0120896 A1 * | 5/2013 | Ono | ...................... | C04B 35/111 |
| | | | | 361/233 |
| 2013/0285336 A1 * | 10/2013 | Ito | ............................ | H01B 1/08 |
| | | | | 279/128 |
| 2014/0113800 A1 * | 4/2014 | Zheng | ................... | C04B 35/634 |
| | | | | 501/135 |
| 2015/0207300 A1 * | 7/2015 | Takeuchi | .............. | C04B 35/111 |
| | | | | 501/135 |
| 2015/0325350 A1 * | 11/2015 | Taguchi | .................. | C04B 35/26 |
| | | | | 252/62.59 |
| 2015/0376024 A1 * | 12/2015 | Yoshikawa | ........... | C23C 14/086 |
| | | | | 423/622 |
| 2016/0049469 A1 * | 2/2016 | Yoshikawa | ........... | C04B 35/111 |
| | | | | 428/446 |
| 2018/0163107 A1 * | 6/2018 | Alary | .................... | C04B 35/111 |

FOREIGN PATENT DOCUMENTS

| | | | |
|---|---|---|---|
| JP | H07-237965 A | 9/1995 | |
| JP | H11-069928 A | 3/1999 | |
| JP | 2014-001116 A | 1/2014 | |
| WO | WO-2010024275 A1 * | 3/2010 | ............. A01K 87/04 |

OTHER PUBLICATIONS

R. W. Rice, "Review: Ceramic tensile strength-grain size relations: grain sizes, slopes, and branch intersections", 1997, Journal of Material Science, 32, 1673-1692 (Year: 1997).*

* cited by examiner

Primary Examiner — Darren W Ark
Assistant Examiner — William L Gmoser
(74) Attorney, Agent, or Firm — Viering Jentschura & Partner mbB

(57) ABSTRACT

A guide member for a fishing line including an alumina ceramic including Ti and Al, a content of Ti being not less than 0.5 mass % in terms of $TiO_2$, a content of Al being not less than 92 mass % in terms of $Al_2O_3$, and a main phase of the alumina ceramic being alumina crystals, wherein a content ratio of aluminas crystal with an aspect ratio of not less than 2 within the alumina crystals is not less than 15%.

7 Claims, No Drawings

GUIDE MEMBER FOR FISHING LINE

TECHNICAL FIELD

The present disclosure relates to a guide member for a fishing line.

BACKGROUND ART

Fishing using reels, such as cast fishing and lure fishing, is widely performed. A rod, on which a plurality of ring-shaped guide members ("guide members for a fishing line" hereinafter) are mounted, is used in such fishing. A fishing line is guided by these guide members for a fishing line.

Such a guide member for a fishing line requires high radial crushing strength such that the guide member is not readily break when it collides with rocks and the like. Thus, a guide member for a fishing line made from ceramic has been used in recent years.

For example, Patent Document 1 proposes a guide member for a fishing line formed by a ceramic made from
from 3.0 to 45.0 wt. % of at least one of $ZrO_2$ and $ZrSiO_4$,
from 0.3 to 5.0 wt. % of at least one of $SiO_2$ and MgO, and
the balance $Al_2O_3$ and unavoidable impurities,
and includes fine crystal particles, a main component of which is at least one of $ZrO_2$ and $ZrSiO_4$, with an average particle size of 0.5 to 1.5 μm and
coarse crystal particles, a main component of which is $Al_2O_3$, with an average particle size of 3 to 10 μm, wherein
the overall average crystal particle size is not greater than 7 μm.

CITATION LIST

Patent Literature

Patent Document 1: JP 11-69928 A

SUMMARY OF INVENTION

A guide member for a fishing line of the present disclosure includes an alumina ceramic including Ti and Al, a content of Ti being not less than 0.5 mass % in terms of $TiO_2$ and a content of Al being not less than 92 mass % in terms of $Al_2O_3$, and a main phase of the alumina ceramic being alumina crystals. A content ratio of alumina crystals with an aspect ratio of not less than 2 within the alumina crystals is not less than 15%.

DESCRIPTION OF EMBODIMENT

The use of a ceramic containing a mixture of alumina ($Al_2O_3$) and zirconia ($ZrO_2$) as the material of a guide member for a fishing line would increase the radial crushing strength. However, zirconia is more expensive than alumina, and cost cannot be reduced, as has become required in recent years. On the other hand, the increase in the content of alumina would reduce the radial crushing strength.

The guide member for a fishing line of the present disclosure has the high radial crushing strength while being inexpensive. A detailed description of the guide member for a fishing line of the present disclosure will be given.

A guide member for a fishing line of the present disclosure includes an alumina ceramic including Ti and Al, a content of Ti being not less than 0.5 mass % in terms of $TiO_2$ and a content of Al being not less than 92 mass % in terms of $Al_2O_3$, and a main phase of the alumina ceramic being alumina crystals. The guide member for a fishing line of the present disclosure includes alumina in a large content, and it is inexpensive compared to a guide member for a fishing line with a high zirconia content. In addition to Ti and Al, the guide member for a fishing line of the present disclosure may also contain silica ($SiO_2$), magnesia (MgO), and calcia (CaO), which function as sintering aids. The guide member for a fishing line of the present disclosure may also contain pigment constituents for increasing decorative properties.

Here, the constituents that constitute the guide member for a fishing line of the present disclosure may be confirmed by measuring the guide member for a fishing line using an X-ray diffractometer (XRD) and comparing the obtained results with JCPDS cards.

Also, in the guide member for a fishing line of the present disclosure, a content ratio of alumina crystals with an aspect ratio of not less than 2 within the alumina crystals is not less than 15%. Due to the fact that the content ratio of alumina crystals with an aspect ratio of not less than 2 within the alumina crystals is not less than 15%, the guide member for a fishing line of the present disclosure has a high radial crushing strength while being inexpensive. This is considered to be because the content ratio of alumina crystals with an aspect ratio of not less than 2 is not less than 15%, and thus, plucking out does not readily occur and mechanical strength is improved.

Specifically, in a profile shape having a thickness of 1.7 mm, width of 2.3 mm, and outer diameter of 14.4 mm, the guide member for a fishing line of the present disclosure has radial crushing strength of not less than 410 MPa, similar to ceramics containing approximately 10% of zirconia and approximately 90% of alumina. Here, the radial crushing strength σr (units: MPa) is determined by the equation $\sigma r=[(p(d-t)/(w \times t2))] \times 9.8$, wherein p (units: kgf) is the load at breakage when a load is suspended on a guide member for a fishing line having the above-described profile shape, d (units: mm) is the outer diameter, t (units: mm) is the thickness, and w (mm) is the width.

In a case where the content ratio of alumina crystals with an aspect ratio of not less than 2 within the alumina crystals is less than 15%, the radial crushing strength will not be high. In the guide member for a fishing line of the present disclosure, the content ratio of alumina crystals with an aspect ratio of not less than 2 may be not greater than 40%.

Furthermore, in the guide member for a fishing line of the present disclosure, the content ratio of alumina crystals with an aspect ratio of not less than 5 within the alumina crystals may be not greater than 10%. In a case where such a configuration is satisfied, the guide member for a fishing line of the present disclosure has a configuration in which gaps between alumina crystals are not readily produced and plucking out occur even less readily, and thus has the higher radial crushing strength.

Furthermore, in a case where such a configuration is satisfied, the guide member for a fishing line of the present disclosure includes few gaps between alumina crystals, which inhibit thermal conductivity, and thus has a high thermal conductivity. When a fishing line is guided by a guide member for a fishing line, heat is generated by friction between the fishing line and the guide member for a fishing line. Here, in a case where the produced heat is not dissipated immediately, it damages the fishing line and the fishing line breaks easily. The guide member for a fishing line of the present disclosure satisfying the above configuration has high thermal conductivity, and thus, heat generated by friction readily dissipates and damage to the fishing line can be suppressed, and as a result, the fishing line does not break easily.

Furthermore, in the guide member for a fishing line of the present disclosure, the maximum aspect ratio of alumina crystals may be less than 5. When such a configuration is satisfied, the guide member for a fishing line of the present disclosure has a configuration in which gaps between alumina crystals are not readily produced, and thus, has the higher radial crushing strength and thermal conductivity.

Additionally, in the guide member for a fishing line of the present disclosure, a standard deviation of the aspect ratios of alumina crystals may be not greater than 0.6. When such a configuration is satisfied, the guide member for a fishing line of the present disclosure has the even higher radial crushing strength and thermal conductivity.

Furthermore, in the guide member for a fishing line of the present disclosure, the degree of circularity of the alumina crystals may be not less than 0.55 and not greater than 0.70. When such a configuration is satisfied, the guide member for a fishing line of the present disclosure has the higher radial crushing strength. Here, the degree of circularity is an index that indicates roundness. A degree of circularity of 1 indicates a perfect circle.

Furthermore, in the guide member for a fishing line of the present disclosure, the average crystal particle size of the alumina crystals may be not less than 1.8 µm and not greater than 3.0 µm. When such a configuration is satisfied, the guide member for a fishing line of the present disclosure has the higher radial crushing strength.

In the guide member for a fishing line of the present disclosure, the content of zirconia may be less than 1.5 mass % in terms of $ZrO_2$ from the perspective of making it inexpensive. Furthermore, it may contain substantially no zirconia. Here, containing substantially no zirconia indicates that the content in terms of $ZrO_2$ is less than 0.1%. With such a configuration, the guide member for a fishing line of the present disclosure is even less expensive.

Next, the methods for measuring the aspect ratio, average crystal particle size, and degree of circularity in the guide member for a fishing line of the present disclosure will be described.

First, the guide member for a fishing line is cut and the observed surface is mirror polished. It is then thermally etched at a temperature that is from 50 to 100° C. lower than the firing temperature. Then, the surface is observed at a magnification of 500× to 1500× using a scanning electron microscope (SEM), and a range having an area of 5160 nm² (for example, horizontal length 60 µm, vertical length 86 µm) is photographed. Here, the observed surface is irradiated with X-rays using an energy dispersive analysis system (EDS) attached to the SEM. Then, the presence of aluminum and oxygen in the crystals is detected, and when the content of aluminum obtained by semi-quantitative analysis is not less than 90 mass % in terms of alumina, the crystals are alumina crystals. Next, the alumina crystals of the photographed image are copied onto a sheet of tracing paper. Then, the sheet of tracing paper is scanned as an image data and the image data is analyzed using a technique called particle analysis using the image analysis software "Azo-kun" (trade name, Asahi Kasei Engineering Corporation). Here, as the analysis conditions, for example, the lightness of particles may be set to dark, the binarization method set to manual, the small figure removal set to 0.8, and the threshold value set to 225. The "maximum/minimum" obtained by analysis may be taken as the aspect ratio, and the average values of "equivalent circle diameter" and "degree of circularity" may be taken as the average crystal particle size and degree of circularity, respectively.

From the obtained values of the aspect ratio, the number of crystals with an aspect ratio of not less than 2 is calculated and the percentage is determined with the total number of alumina crystals as the denominator to determine the content ratio of alumina crystals with an aspect ratio of not less than 2 within the alumina crystals.

Similarly, from the obtained values of the aspect ratio, the number of crystals with an aspect ratio of not less than 5 is calculated and the percentage is determined with the total number of alumina crystals as the denominator to determine the content ratio of alumina crystals with an aspect ratio of not less than 5 within the alumina crystals. Furthermore, it can be judged from the obtained aspect ratio whether the maximum aspect ratio of the alumina crystals is less than 5.

In the guide member for a fishing line of the present disclosure, the lightness factor in CIE 1976 L*a*b* color space by the diffuse reflection process may be not less than 15 and not greater than 25, the psychometric chroma coordinate a* may be not less than 2 and not greater than 7, and the psychometric chroma coordinate b* may be not less than −25 and not greater than −8. When it has such a configuration, the guide member for a fishing line of the present disclosure exhibits a stately dark blue color tone with muted intensity, and can impart a luxury feel and a sense of esthetic satisfaction to the consumer.

Here, the lightness factor L* is an index indicating the lightness or darkness of a color tone. The larger value of lightness factor L* indicates light color tone, and the smaller lightness factor L* indicates dark color tone.

The psychometric chroma coordinate a* is an index indicating the position between red and green of a color tone. The large positive value of the psychometric chroma coordinate a* indicates red color tone, and the smaller absolute value thereof indicates subdued color tone with suppressed intensity. The large negative value of the psychometric chroma coordinate a* indicates green color tone.

The psychometric chroma coordinate b* is an index indicating the position between yellow and blue of a color tone. The large positive value of the psychometric chroma coordinate b* indicates yellow color tone, and the smaller absolute value thereof indicates subdued color tone with suppressed intensity. The large negative value of the psychometric chroma coordinate b* indicates blue color tone.

Note that the lightness factor L* in CIE 1976 L*a*b* color space by the diffuse reflection process and the psychometric chroma coordinates a* and b* may be measured according to JIS Z 8700-2000 using a colorimeter (former Minolta Corp. model CR-221 or successor models). As measurement conditions, a CIE standard light source D65 may be used as a light source, the illumination receiving mode may be a ((45−n) [45−0]), and the measurement diameter may be 3 mm.

Next, an example of a manufacturing method of the guide member for a fishing line of the present disclosure will be described.

First, alumina ($Al_2O_3$) powder is prepared. Then, titanium oxide ($TiO_2$) powder is prepared as a grain growth promoter to form alumina crystals with an aspect ratio of not less than 2. As sintering aid powder, for example, silicon oxide ($SiO_2$) powder and magnesium hydroxide ($Mg(OH)_2$) powder are prepared. Then, the alumina powder is weighed out to a content of not less than 92 mass % in terms of $Al_2O_3$ in the alumina ceramic.

Then, the titanium oxide powder is weighed out to a content of not less than 0.5 mass % in terms of $TiO_2$ in the alumina ceramic. Note that in a case where the content in terms of $TiO_2$ in the alumina ceramic is greater than 3.0 mass %, the change in grain growth promoting effect by titanium oxide is small and thus the change in content ratio of alumina crystals with an aspect ratio of not less than 2 is small. Thus, from the perspective of manufacturing cost, the upper limit of content in terms of $TiO_2$ in the alumina ceramic may be not greater than 3.0 mass %.

Furthermore, for the sintering aid powder, for example, the silicon oxide powder is weighed out to a content of not less than 0.1 mass % and not greater than 1.0 mass % in terms of $SiO_2$ in the alumina ceramic. Additionally, the magnesium hydroxide powder is weighed out to a content of not less than 0.1 mass % and not greater than 0.5 mass % in terms of MgO in the alumina ceramic.

Furthermore, in order for the lightness factor L in CIE 1976 L*a*b* color space by the diffuse reflection process to be not less than 15 and not greater than 25, the psychometric chroma coordinate a* to be not less than 2 and not greater than 7, and the psychometric chroma coordinate b* to be not less than −25 and not greater than −8, for example, chromium oxide ($Cr_2O_3$) powder, manganese oxide ($MnO_2$) powder, cobalt oxide ($Co_3O_4$) powder, iron oxide ($Fe_3O_4$), and the like are prepared as pigments. They may be weighed out and added such that a total content of pigments in the alumina ceramic is not less than 2 mass % and not greater than 5 mass %. Note that the ratios in the pigment are, for example, not less than 2 parts by mass and not greater than 25 parts by mass of chromium oxide powder, not less than 5 parts by mass and not greater than 25 parts by mass of manganese oxide powder, not less than 45 parts by mass and not greater than 85 parts by mass of cobalt oxide powder, and not less than 0.5 parts by mass and not greater than 5 parts by mass of iron oxide powder, per 100 parts by mass of pigments.

Next, the weighed-out powders and water as a solvent are loaded in a vibrating mill or ball mill or the like, where they are mixed and ground, and a binder is further added and mixed. Then, granulated granules are obtained by spray-drying using a spray-drying apparatus. These granules are then molded into an annular shape by dry pressing. A powder compact may also be obtained by injection molding.

After the obtained powder compact is degreased as necessary, it is held and fired for 1 to 4 h at a maximum temperature of not lower than 1350° C. and not higher than 1500° C. in an air atmosphere. Note that the temperature elevation rate from 1000° C. to the maximum temperature may be from 80 to 150° C./h.

Here, the hold time at maximum temperature is not greater than 3 h, and then the content ratio of alumina crystals with an aspect ratio of not less than 5 will be not greater than 10%. Additionally, the hold time at maximum temperature is not greater than 2 h, and then the maximum aspect ratio of the alumina crystals will be less than 5.

After that, the obtained sintered compact is barrel polished to produce the guide member for a fishing line of the present disclosure. Note that the barrel polishing may be performed for approximately 24 h in a wet centrifugal barrel polisher using, for example, a medium and green carborundum (GC).

Furthermore, the standard deviation of the particle sizes of the alumina powder may be adjusted such that the standard deviation of the aspect ratios of the alumina crystals is not greater than 0.6.

Hereinafter, examples of the present disclosure will be specifically described. However, the present disclosure is not limited to these examples.

Example 1

Guide members for a fishing line having different content ratios and different degrees of circularity of alumina crystals with an aspect ratio of not less than 2 were produced, and the radial crushing strength was compared.

First, aluminum oxide powder, titanium oxide powder, zirconium oxide powder, pigment constituent powder, and sintering aid powder were prepared. Note that the zirconium oxide powder used contained yttria as a stabilizing constituent, wherein the yttria content was 2.5 mol % of a total of 100 mol % of zirconia and yttria alone. As the pigment constituent powder, chromium oxide powder, manganese oxide powder, cobalt oxide powder, and iron oxide powder were weighed out and mixed to a mass ratio of 23:21:53:3. As the sintering aid powder, silicon oxide powder and manganese hydroxide powder were weighed out and mixed to a mass ratio of 2:1.

Then, each powder was weighed out such that the contents thereof in the alumina ceramic after sintering would be the values shown in Table 1.

Next, the weighed-out powders and water as a solvent were loaded in a vibrating mill or ball mill or the like, where they were mixed and ground, and a binder was further added and mixed. Then, granulated granules were obtained by spray-drying using a spray-drying apparatus. These granules were then molded into an annular shape by dry pressing.

After the obtained powder compact was degreased, it was held and sintered for 1.5 h at a maximum temperature of 1420° C. in an air atmosphere. After that, Sample Nos. 1 to 11 having a profile shape measuring 1.7 mm in thickness, 2.3 mm in width, and 14.4 in outer diameter were obtained by barrel polishing the obtained sintered compacts.

The aspect ratio and the degree of circularity in each sample were measured as follows.

First, each sample was cut and the surface to be observed was mirror polished. It was then thermally etched at 1370° C. Then, the surface was observed at a magnification of 1000× using a SEM, and a range having an area of 5160 μm² (horizontal length 60 μm, vertical length 86 μm) was photographed. Next, the alumina crystals of the photographed image were copied onto a sheet of tracing paper. Then, this sheet of tracing paper was scanned as an image data and the image data was analyzed using a technique called particle analysis using the image analysis software "Azo-kun".

Here, as the analysis conditions, the lightness of particles was set to dark, the binarization method was set to manual, the small figure removal was set to 0.8, and the threshold value was set to 225. The "maximum/minimum" obtained by analysis was taken as the aspect ratio, and the average value of "degree of circularity" was taken as the degree of circularity.

From the obtained values of the aspect ratio, the number of crystals with an aspect ratio of not less than 2 was calculated and the percentage was determined with the total number of alumina crystals as the denominator to determine the content ratio of alumina crystals with an aspect ratio of not less than 2 within the alumina crystals.

Furthermore, the radial crushing strength of each sample was determined. The radial crushing strength σr (units: MPa) was determined by the equation $\sigma r=[(p(d-t)/(w\times t2))]\times 9.8$, where the load at breakage was measured when a load was suspended on the obtained sample and then the outer diameter was taken as d (units: mm), the thickness was taken as t (units: mm), and the width was taken as w (mm). Results are shown in Table 1.

TABLE 1

| Sample No. | Al$_2$O$_3$ (mass %) | TiO$_2$ (mass %) | ZrO$_2$ (mass %) | Pigment constituents (mass %) | Sintering aid (mass %) | Content ratio of alumina crystals with aspect ratio not less than 2 (%) | Degree of circularity | Radial crushing strength (MPa) |
|---|---|---|---|---|---|---|---|---|
| 1  | 71 | 1.7 | 10.5 | 15.5 | 1.3 | 2  | 0.83 | 410 |
| 2  | 87 | 1.9 | 0    | 9.7  | 1.4 | 3  | 0.82 | 270 |
| 3  | 90 | 2.0 | 0    | 6.0  | 2.0 | 15 | 0.74 | 320 |
| 4  | 92 | 0.3 | 0    | 4.0  | 3.7 | 13 | 0.78 | 370 |
| 5  | 92 | 0.5 | 0    | 4.0  | 3.5 | 15 | 0.75 | 410 |
| 6  | 93 | 0.5 | 0    | 4.0  | 2.5 | 19 | 0.73 | 420 |
| 7  | 93 | 1.5 | 0    | 4.0  | 1.5 | 23 | 0.70 | 440 |
| 8  | 93 | 2.0 | 0    | 4.0  | 1.0 | 30 | 0.65 | 460 |
| 9  | 93 | 2.5 | 0    | 4.0  | 0.5 | 33 | 0.55 | 470 |
| 10 | 93 | 3.0 | 0    | 3.0  | 1.0 | 36 | 0.53 | 430 |
| 11 | 93 | 3.5 | 0    | 3.0  | 0.5 | 37 | 0.51 | 420 |

As shown in Table 1, for Sample Nos. 2 and 3, of which the content of Al in terms of Al$_2$O$_3$ was less than 92 mass %, the radial crushing strength was not greater than 320 MPa and mechanical strength was small. For Sample No. 4, of which the content of Al in terms of Al$_2$O$_3$ was 92 mass % and the content of Ti in terms of TiO$_2$ was 0.3 mass %, the content ratio of alumina crystals with an aspect ratio of not less than 2 was less than 15%, and radial crushing strength was 370 MPa and mechanical strength was small.

In contrast, Sample Nos. 5 to 11 had a Ti content in terms of TiO$_2$ of not less than 0.5 mass % and an Al content in terms of Al$_2$O$_3$ of not less than 92 mass %, and the content ratio of alumina crystals with an aspect ratio of not less than 2 within the alumina crystals was not less than 15%. Thus, it was found that Sample Nos. 5 to 11 had mechanical strength equal to or greater than that of Sample No. 1, which contained zirconia and had a high radial crushing strength of not less than 410 MPa.

Furthermore, for Sample Nos. 7 to 9, of which the degree of circularity of alumina crystals was not less than 0.55 and not greater than 0.70, the radial crushing strength was not less than 440 MPa and it was found that mechanical strength improved.

Example 2

Next, guide members for a fishing line with different content ratios of alumina crystals with an aspect ratio of not less than 5 and different maximum aspect ratios of the alumina crystals were produced, and the radial crushing strength and thermal conductivity were compared.

To produce the samples, the same manufacturing method as Sample No. 8 of Example 1 was used except that the hold times at maximum temperature shown in Table 2 were used. Note that Sample No. 12 was the same as Sample No. 8 of Example 1.

Next, the aspect ratio in each sample was determined by the same method as in Example 1. Then, the content ratio of alumina crystals with an aspect ratio of not less than 5 within the alumina crystals was calculated by calculating the number of alumina crystals with an aspect ratio of not less than 5 from the obtained aspect ratio and determining the percentage with the total number of alumina crystals as the denominator. The content ratio of alumina crystals with an aspect ratio of not less than 2 was not less than 15% in all samples.

Next, the radial crushing strength of each sample was determined by the same method as in Example 1. Furthermore, for thermal conductivity, test samples were made by the same manufacturing method using the same raw materials for each sample, and thermal conductivity was determined by the laser flash method according to JIS R 1611-2010. Results are shown in Table 2.

TABLE 2

| Sample no. | Hold time (h) | Content ratio of alumina crystals having aspect ratio not less than 5 (%) | Maximum aspect ratio | Radial crushing strength (MPa) | Coefficient of thermal conductivity (W/m · K) |
|---|---|---|---|---|---|
| 12 | 1.5 | 0  | 4.0 | 460 | 17 |
| 13 | 2.0 | 0  | 4.6 | 450 | 16 |
| 14 | 2.5 | 6  | 5.0 | 440 | 14 |
| 15 | 3.0 | 10 | 6.2 | 430 | 14 |
| 16 | 3.5 | 13 | 7.4 | 410 | 13 |

As shown in Table 2, for Sample Nos. 12 to 15, of which the content ratio of alumina crystals with an aspect ratio of not less than 5 within the alumina crystals was not greater than 10%, the radial crushing strength was not less than 430 MPa and the thermal conductivity was not less than 14 W/m·K. Thus, it was found that these samples were superior in mechanical strength and thermal conductivity.

Additionally, for Sample Nos. 12 and 13, of which the maximum aspect ratio of alumina crystals was less than 5, the radial crushing strength was not less than 450 MPa and the thermal conductivity was not less than 16 W/m·K. Thus, it was found that these samples were superior in mechanical strength and thermal conductivity.

Example 3

Next, guide members for a fishing line with different standard deviations of aspect ratio of alumina crystals were produced, and the radial crushing strength and thermal conductivity were compared.

To produce the samples, the same manufacturing method as Sample No. 8 of Example 1 was used except that the standard deviation of particle size of the raw material alumina powder was adjusted such that the standard deviation of aspect ratio of the alumina crystals was as shown in Table 3. Note that Sample No. 17 is the same as Sample No. 8 of Example 1.

The aspect ratio in each sample was determined by the same method as in Example 1, and the standard deviation of the aspect ratio was calculated. Additionally, the content ratio of alumina crystals with an aspect ratio of not less than 2 was not less than 15% in all samples.

Next, the radial crushing strength of each sample was determined by the same method as in Example 1. Furthermore, the coefficient of thermal conductivity of each sample was determined by the same method as in Example 1. Results are shown in Table 3.

TABLE 3

| Sample No. | Standard deviation of aspect ratios | Radial crushing strength (MPa) | Coefficient of thermal conductivity (W/m · K) |
|---|---|---|---|
| 17 | 0.51 | 460 | 17 |
| 18 | 0.60 | 460 | 17 |
| 19 | 0.70 | 450 | 16 |

As shown in Table 3, for Sample Nos. 17 and 18, of which the standard deviation of aspect ratio of alumina crystals was not greater than 0.6, the radial crushing strength was 460 MPa and the thermal conductivity was 17 W/m·K. Thus, it was found that these samples were superior in mechanical strength and thermal conductivity.

Example 4

Next, guide members for a fishing line with different average crystal particle sizes of alumina crystals were produced, and the radial crushing strength was compared.

To produce the samples, the same manufacturing method as Sample No. 8 of Example 1 was used except that the maximum temperatures shown in Table 4 were used. Note that Sample No. 22 is the same as Sample No. 8 of Example 1.

Then, to determine the average crystal particle size of the alumina crystals of each sample, image analysis was performed by a technique called particle analysis using the image analysis software "Azo-kun" (trade name, Asahi Kasei Engineering Corporation), similar to Example 1.

Here, as the analysis conditions, the lightness of particles was set to dark, the binarization method was set to manual, the small figure removal was set to 0.8, the threshold value was set to 225, and the average equivalent circle diameter obtained by analysis was taken as the average crystal particle size.

Next, the radial crushing strength of each sample was determined by the same method as in Example 1. Results are shown in Table 4.

TABLE 4

| Sample No. | Average crystal particle size (μm) | Maximum temperature (° C.) | Radial crushing strength (MPa) |
|---|---|---|---|
| 20 | 1.6 | 1380 | 420 |
| 21 | 1.8 | 1400 | 450 |
| 22 | 2.4 | 1420 | 460 |
| 23 | 3.0 | 1440 | 450 |
| 24 | 3.2 | 1460 | 420 |

As shown in Table 4, for Sample Nos. 21 to 23, of which the average crystal particle size of alumina crystals was not less than 1.8 μm and not greater than 3.0 μm, the radial crushing strength was not less than 450 MPa, and it was found that the mechanical strength was superior.

The invention claimed is:

1. A guide member for a fishing line; wherein the guide member comprises:
    an alumina ceramic including Ti and Al, wherein a content of Ti is not less than 0.5 mass % in terms of $TiO_2$, wherein a content of Al is not less than 92 mass % in terms of $Al_2O_3$, and wherein a main phase of the alumina ceramic is alumina crystals, wherein
    a content ratio of alumina crystal with an aspect ratio of not less than 5 within the alumina crystals is not greater than 10%;
    wherein the guide member comprises a radial crushing strength of at least 410 MPa.
2. The guide member for a fishing line according to claim 1, wherein a maximum aspect ratio of the alumina crystals is less than 5.
3. The guide member for a fishing line according to claim 1, wherein a standard deviation of aspect ratios of the alumina crystals is not greater than 0.6.
4. The guide member for a fishing line according to claim 1, wherein a degree of circularity of the alumina crystals is not less than 0.55 and not greater than 0.70.
5. The guide member for a fishing line according to claim 1, wherein an average crystal particle size of the alumina crystals is not less than 1.8 μm and not greater than 3.0 μm.
6. The guide member for a fishing line according to claim 1, wherein
    a lightness factor in CIE 1976 L*a*b* color space by a diffuse reflection process is not less than 15 and not greater than 25,
    a psychometric chroma coordinate a* is not less than 2 and not greater than 7, and
    a psychometric chroma coordinate b* is not less than −25 and not greater than −8.
7. A guide member for a fishing line; wherein the guide member comprises:
    an alumina ceramic including Ti and Al, wherein a content of Ti is not less than 0.5 mass % in terms of $TiO_2$, wherein a content of Al is not less than 92 mass % in terms of $Al_2O_3$, and wherein a main phase of the alumina ceramic is alumina crystals;
    wherein a maximum aspect ratio of the alumina crystal is 5; and
    wherein the guide member comprises a radial crushing strength of not less than 410 MPa.

* * * * *